Feb. 25, 1969  S. J. LAWRENCE  3,429,217

MUSIC-NOTE INDICATOR

Filed July 3, 1967  Sheet 1 of 2

INVENTOR.
SIDNEY J. LAWRENCE

BY Robert Berliner

ATTORNEY.

United States Patent Office 3,429,217
Patented Feb. 25, 1969

3,429,217
MUSIC-NOTE INDICATOR
Sidney J. Lawrence, 229 Oakford St.,
West Hempstead, N.Y. 11552
Continuation-in-part of application Ser. No. 545,472,
Apr. 26, 1966. This application July 3, 1967, Ser.
No. 650,980
Filed July 3, 1967, Ser. No. 650,980
U.S. Cl. 84—471                              17 Claims
Int. Cl. G09b 15/04

ABSTRACT OF THE DISCLOSURE

A music note indicating device wherein one of several panels of music staff indicia can be selectively associated with transmission means and note indicating means so that selective contact of the panel results in sounding and/or visual display of an appropriate note.

CROSS-REFERENCE TO RELATED APPLICATIONS

This application is a continuation-in-part of application Ser. No. 545,472, filed Apr. 26, 1966, entitled, "Music-Note Indicating Device."

BACKGROUND OF THE INVENTION

Field of the invention

The field of art to which the invention pertains includes the field of music, particularly music teaching devices.

Description of the prior art

It is well known among music educators that a large percentage of beginning music students are confused in attempting to understand the function of music notation. Understanding the staff with its lines and spaces, the notes, black and white, with or without stems and flags, often seems too complicated a task for these students to master. The beginning method books which introduce notation via a picture of a grand staff with notes placed stepwise diagonally up and down merely leave a fixed image of a pyramid and no understanding of their true meaning.

A primary problem in this respect is to relate the introduction of music notation to the sounds which notes represent. To insure basic music reading the student must come to understand that the entire length of each line or space on the staff on which a note is placed represents the pitch-tone (and the printed note itself actually only represents time-value). Students become confused because they have not clearly defined the differences of the function of the staff lines and spaces as compared to the printed note. Thus there is a need for a device which vividly depicts an entire staff line or space as representing a particular pitch tone, allowing the teacher to freely explain note time values. Further there is need for a device which, through simultaneous tactile, auditory and visual learning, clearly illustrates that differences in tone pitches are indicated by the number of lines and spaces between notes.

Such a device is described and claimed in my method earlier application. The device includes a panel of music staff indicia in association with transmission means for transmitting current to an appropriate note indicator. In a specific embodiment, the transmission means comprises a board of electrical leads and the panel is positioned thereover in staff relationship with respect to the indicia. Contact of a line or space causes, through the leads, a corresponding note to be sounded and/or visually displayed. While accomplishing its objectives in providing for simultaneous tactile, auditory and visual impressions, the device suffers a drawback in that different devices, with appropriate staff and note indicating arrangements, are needed for different classes of instruments. For example, if the device is wired and staff printed for piano, it cannot be accurately used for a transposing instrument such as trumpet, clarinet, viola, sax or French horn. These instruments do not sound in concert pitch, i.e., A on these instruments does not sound the same as A on the piano.

SUMMARY OF THE INVENTION

The above drawbacks are now eliminated by the inherent invention in which two or more panels of staff indicia are provided. The invention contemplates a music note indicating device having note indicating means, transmission means associated therewith and at least two panels of staff indicia arranged to allow selective association of a panel with the transmission means so that the note indicating means is actuated by the transmission means in response and correspondence to selective contact of the associated panel.

In a particular embodiment, the panel's comprise a succession of frames on a roll of sheet material and each frame of staff indicia is appropriate to one or a class of musical instruments. The indicia are positioned on each frame so as to obtain a correspondence of line or space thereof and transmission means appropriate to the instrument or class of instrument represented by the indicia.

The note indicating means causes the note to be sounded and/or visually displayed. In a particular embodiment visual display can be achieved by illumination of lettered music symbols on the panel itself. When sounding means are included, switch means can be provided for causing the flat or sharp of one or more selected notes to be sounded in place of such selected notes so as to facilitate more accurate correspondence of the sound to the pitch of an instrument represented by the selectively associated panel of staff indicia.

BRIEF DESCRIPTION OF THE DRAWING

FIG. 4 is a plan view of the device of FIG. 1 with its roll of staff indicia panels extended; and FIG. 5 is a table comparing the relative staff positions, of various classes of instruments, on the roll of staff indicia panels shown in FIG. 4.

DESCRIPTION OF THE PREFERRED EMBODIMENT

Figure 1:
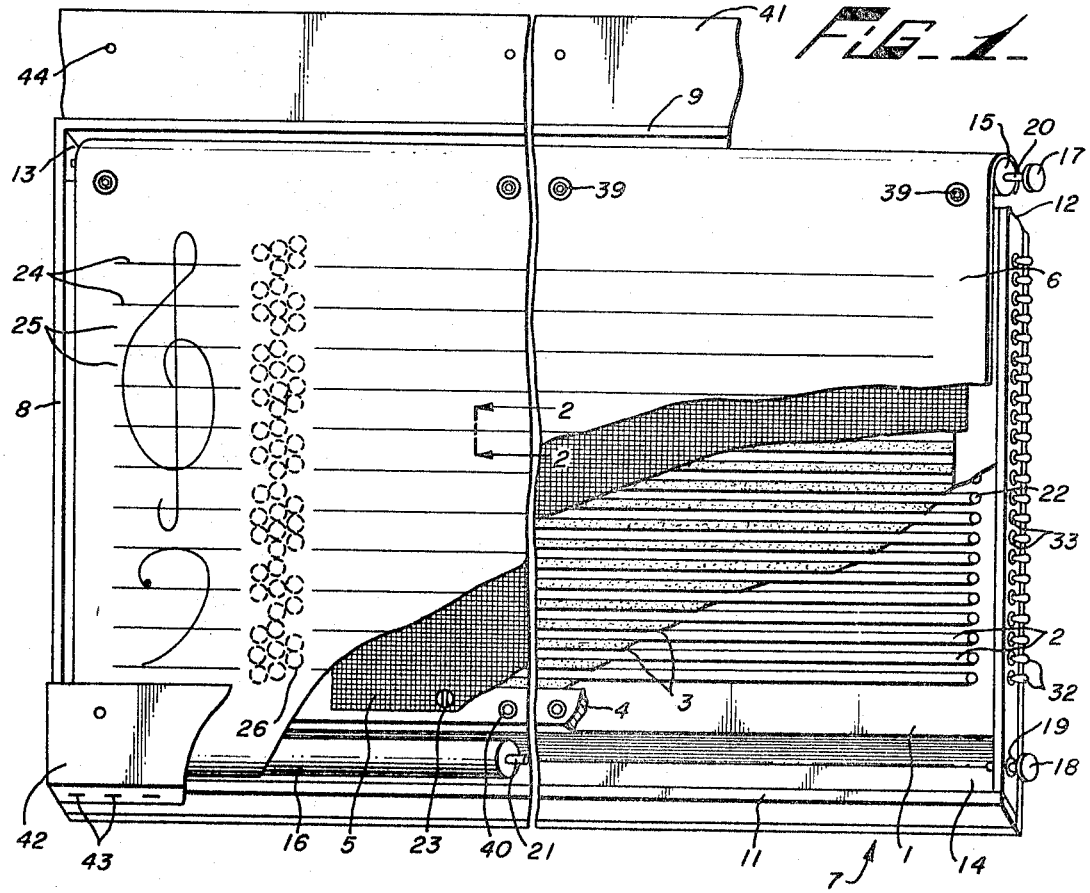
FIG. 1 is a perspective, partially cut away, front view of one form of device embodying the invention.
Figure 2:
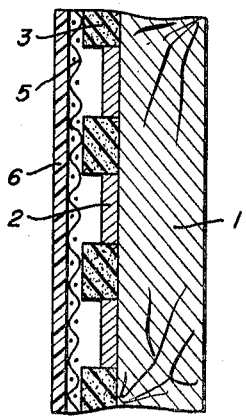
FIG. 2 is a sectional view along the line 2—2 of FIG. 1.

Referring to FIGS. 1 and 2, the device comprises a rectangular base 1, in this case constructed of ¾ inch plywood with dimensions of 3 by 9 feet, on which are secured twenty-two ½ inch wide copper strips 2, each representing a line or space of a grand staff. The copper strips 2 run along the length of the base 1 from a margin on the right side of about 3 inches to a margin of about 17 inches on the left side. Twenty-three sponge rubber strips 3, each ⅜ inch wide and 3/16 inch thick, separate the copper strips 2 and are secured alternating therewith on the base 1. A frame or mask 4, of ⅛ inch plywood, is secured around the edges of the base 1 leaving a "sight" of about 2.5 by 7.3 feet. A copper screen or mesh 5 overlays the copper and rubber strips 2 and 3 and the "sight" of mask 4 and is secured to the mask 4. A 9 foot wide flexible sheet of white plastic 6 overlies the wire screen 5.

The base 1 is secured in a box indicated generally at 7 and having an inside dimension of 3½ by 9 feet defined by side panels 8, 9, 10 and 11 overlying bottom panel 12. Two troughs 13 and 14 are present between the edges of base 1 and side panels 9 and 11 and serve to receive and hold rolled up portions 15 and 16 of the plastic sheet 6. Knobs 17 and 18 are provided for turning sheet 6 and are secured through holes (e.g., 19) in side panel 10 to cores 20 and 21 around which rolled portions 16 and 17 are formed.

The copper strips 2 are secured to the base 1 by current conducting bolts 22 running through the thickness of the base 1 and bottom panel 12 and extending somewhat beyond. The copper screen 5 has a bolt 23 at its lower edge extending through the mask 4, base 1 and bottom panel 12 and somewhat beyond. The sheet of panel 6 is preferably somewhat translucent and has successive parallel lines 24 and spaces 25 portrayed thereon in musical staff relation and representing a staff indicia. Letter-symbols 26 are affixed to the underside of the panel 6, each over a line 24 or space 25 on the left hand side of panel 6. The symbols are arranged in groups according to the appropriate flats, naturals and sharps of the particular staff chosen, the exact arrangement depending on the class of musical instrument represented by the staff indicia. A number of socket holes (not shown) are provided in base 1, extending through bottom panel 12 and underlying the letter symbols 26. Light bulbs (e.g., 27 in FIG. 3) are secured in the socket holes for selectively illuminating the letter symbols. The holes are generally arranged in staggered groups of three, but as will be seen there may be less than three holes, and associated bulbs) for particular lines or spaces.

FIG. 1 shows cut-away portions of the device to illustrate its construction. Thus side panel 9 is cut away on its right side and the lower right hand corner portions of sheet 6, screen 5, rubber strips 3, copper strips 2, frame 4 and rolled portion 16 are cut away for clarity of disclosure. FIG. 2 shows a side view of a portion of the device, as indicated on FIG. 1. It is seen that a slight pressure on panel sheet 6 will compress one or more rubber strips 3 so that screen 5 makes contact with a single copper strip 2 at the point of contact of panel sheet 6.

Figure 3:
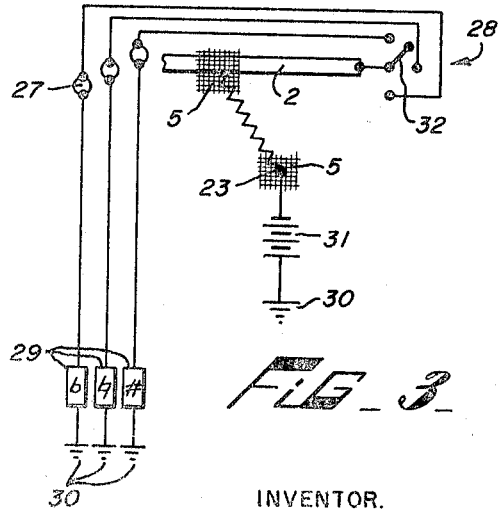
FIG. 3 is a partially schematic, partially diagrammatic view of one circuit formed in operation of the device of FIG. 1.

FIG. 3 schematically shows the wiring and circuitry of the device. The right end of each copper strip 2 is connected to a 3-pole switch 28, each pole being connected to a separate light bulb 27 of a staggered set of three bulbs. Each bulb represents the flat, natural or sharp of a note. The other terminal of each bulb 27 is connected through the corresponding socket hole in the base to a solenoid which, in turn, is connected to ground 30. The solenoids are placed over the keyboard of a piano and arranged so that upon actuation the appropriate key is struck. One terminal of a battery 31 is connected to the copper screen 5 by means of bolt 23 and the other terminal to ground 30. The electrical connections to the copper strips 2 and screen 5 are secured by nuts tightened on the securing bolts 22 and 23. By depressing a line 24 or space 25 on the panel 6, the screen 5 is made to contact the copper strip 2 that corresponds to the staff position of that line or space, thereby forming a closed circuit with the screen 5, a copper strip 2, a bulb 27, a solenoid 29 and the battery 31. Accordingly, by depressing a line 24 or space 25 on the panel 6, the bulb 27 under the letter-symbol 26 designating that note is lit, displaying its letter-symbol, and, concurrently, the noted is sounded by the solenoid 29. The 3-pole switch 28 allows pre-selection of the flat, natural or sharp of a note. Thus when the toggle 32 of the switch 28 is centered, the natural of the note will be shown and sounded. When the toggle 32 is up or down, the sharp or flat, respectively, of the note will be shown and sounded. The toggles 32 extend through holes 33 in side panel 10. Thus, the base 1, rubber strips 3, copper strips 2, screen 5 and, optionally, switches 28 represent one form of a transmisison ensemble for transmitting current to the note indicators, i.e., the light bulbs 27 and solenoids 29.

Referring to FIG. 4, the sheet of panels 6 is shown extended from the board. Five panels 34–38 are illustrated and, accordingly, the total length of the sheet is about 18 feet. Each panel 34–38 is defined by holes 39 along its border which are arranged to fit over the female part of snaps 40 secured to frame 4. Flaps 41 and 42 are secured to end panels 9 and 11 by staples 43 and are arranged to overly top and bottom portions, respectively, of the panel of sheet 6 overlying base 1. Male counterparts 44 to snaps 40 pass through holes 39 and fasten into snaps 40 to secure the panel in place. By turning knob 17 or 18, a particular panel can be placed over the transmission ensemble and then locked firmly in place by means of flaps 41 and 42 and snap parts 40 and 44. In place of, or in addition to, knobs 17 or 18, a motorized method of turning may be used.

The first panels 34–38 shown are appropriate for piano, B flat instruments (such as trumpet and clarinet), E flat alto sax, French horn and viola, respectively. The position of each staff relative to the panel is determined by the staff positions of the instrument or class of instrument and is illustrated by the table shown in FIG. 5. Referring to FIGS. 4 and 5, the letters A on panel 34 represents piano A and when the space indicated thereby is pressed, the note A will be shown and sounded (in flat, natural or sharp, depending on the position of the switch). If panel 35 is in place, and all B and E note switches are turned down to yield the corresponding flats (with the remaining notes natural), then B flat instruments will be represented. The letter B on panel 35 represents the note B on such instruments. It is arranged to directly overlie the piano A portion of panel 34, but when pressed, B flat will be shown and sounded. Similarly, when other lines or spaces are pressed, the corresponding notes appropriate to B flat instruments will be shown and sounded. The letter F of panel 36 is arranged to directly overlie the piano A of panel 34, but, when all B, E and A switches are turned down to flat, notes appropriate to an E flat alto sax will be shown and sounded. In a similar manner, the letter E of panel 37 is arranged to directly overlie the piano A of panel 34, but, when all B switches are turned down to flat, notes appropriate to a French horn are shown and sounded. Likewise, the letter A of panel 38 is arranged to directly overlie the piano A of panel 34 and when all switches are on natural, notes appropriate to the viola are shown and sounded.

Referring to FIG. 5, it can be seen that, for the array of instruments represented on the particular sheet of panels shown, not every copper strip need have three associated light bulbs and solenoids. Thus, at the lower end of the scale no bulbs are needed for B sharp and E sharp. However, to allow the transmission ensemble to be readily adaptable to still other instruments, as may be represented on a different or extended sheet of panels, these bulbs and solenoids are generally not omitted.

By means of my invention, even very young children can learn notation more quickly and with greater ease and comprehension than heretofore possible. The student is faced with a blank, empty staff indicia. He doesn't know the name or sound of a note until he presses a line or space with his finger or a "dummy" solid note. Only then does he hear the sound and see the note name flash on. That he can press anywhere on the length of the line or space is of critical importance; he quickly learns that the space or line represents a sound, not the black object, the note. Further, by moving his hands up and down to sound out different notes he quickly learns that sounds move in exactly that manner. Thus he discovers pitch direction, and since he can move vertically, obliquely up and down, and in any direction, he attains a clear concept of the "pitch pictures" that groups of notes can make. Further, in teaching interval spacing, i.e., steps and skips, the student learns that "line to line" represents a skip, as well as "space to space."

The device is described above using solenoids to produce the appropriate sound, the solenoids being placed over the keys of a piano. Other sounding means can be used; for example, the lead wires 16 can be readily connected to the appropriate tubes of an electric piano or organ, to a variable frequency oscillator, to a recording of the appropriate instrument or to any suitable sounding means. Additional or alternate switch means might be arranged so that individual switches need not be turned. Thus one pushbutton might direct the current to a sharp, another to a flat and a third to return to the natural of any note touched. One might also short circuit the solenoid or the bulbs if he desired only a display or sounding of a note. Other note displaying means can also be provided remote from the panel to replace or supplement the panel notes.

Another variation within the scope of the invention is to replace the screen 5 with microswitches over the copper strips 2. By proper placement, current can be conducted through the strips when pressure is applied at any point along the length of the line. Similarly, the metal strips may be placed in slots with spring retainers and a hand-held magnet used to bring the strip in contact with the screen when the magnet is placed on the panel. Other current conductors can, of course, be used in place of copper and other material in place of the rubber strips 3 and plastic panel 6, which need not be translucent. Still other modifications and variations may be effected without departing from the spirit and scope of the novel concepts of this invention.

I claim:
1. A music-note indicating device, comprising:
   note indicating means;
   at least two panels, each bearing lines and spaces in representation, of staff indicia, said lines extending for a distance substantially greater than the separation between adjacent ones thereof to define said spaces;
   switch means operatively associated with said note indicating means, comprising opposed electrical contact means extending continuously for said distance and closing in response to manual contact of a line or space at any point thereon along said distance exteriorly of said panel to actuate said note indicating means in correspondence to said manual contact, and opening upon release of said manual contact; and
   means for selectively disposing a different one of said panels in alignment over said switch means with its staff indicia in correspondence to said successively disposed conductors.
2. The device of claim 1 wherein the note indicating means causes the note to be sounded.
3. The device of claim 2 including selectively operable second switch means for causing the first of one or more appropriate notes to be sounded in response to appropriate contact of a panel of staff indicia that is characterized by said one or more flat notes.
4. The device of claim 3 wherein said second switch means allows the flat or sharp of said note to be sounded in place of said note.

5. The device of claim 1 wherein the note indicating means visually displays the note on the panel overlying said switch means.
6. The device of claim 5 wherein the note is sounded concurrent with visual display thereof.
7. The device of claim 1 wherein the note indicating means comprises solenoids arranged in staff correspondence to the staff indicia, each solenoid being capable of producing a sound corresponding to a particular line or space of the indicia.
8. The device of claim 7 wherein the note indicating means include illumination means energized by said first switch means, and corresponding appropriate letter symbols, on the panel disposed over said first switch means, selectively illuminable by the illumination means.
9. A music note indicating device, comprising:
   at least two panels of music staff indicia, each panel having illuminable letter symbols of music notes thereon;
   means for illuminating the letter symbols of one of said panels;
   transmission means underlying said one panel and responsive to manual contact of said one panel to selectively energize said illuminating means in correspondence to said contact; and
   means for selectively disposing said panels over said transmission means.
10. A music note indicating device, comprising:
    note indicating means;
    a roll of flexible, rollable sheet material having a succession of frames of music staff indicia thereon;
    transmission means underlying one of said frames and responsive to manual contact of said one frame to selectively actuate said note-indicating means in correspondence to said contact;
    means for moving said sheet material relative to said transmission means to dispose a different one of said frames in alignment over said transmission means;
    first alignment means on each of a plurality of said frames; and
    second alignment means cooperating with said first alignment means to secure said disposed frame in said alignment.
11. The device of claim 10 wherein each frame of staff indicia represents indicia appropriate to one or a class of predetermined musical instruments.
12. The device of claim 11 wherein the indicia are positioned on each frame so as to obtain a correspondence of line or space of indicia and portion of transmission means appropriate to the instrument or class of instruments represented by the indicia.
13. The device of claim 12 including means for aligning the frames in association with the transmission means.
14. The device of claim 12 wherein the transmission means comprises electrical leads positioned in staff relationship with respect to the panel disposed thereover and in correspondence with the indicia whereby contact of a line or space of the indicia causes current to be supplied to the lead corresponding to the contacted line or space to thereby actuate the note indicating means.
15. The device of claim 12 wherein the note indicating means causes the note to be sounded.
16. The device of claim 15 including selectively operable switch means for causing the flat of one or more appropriate notes to be sounded in response to appropriate contact of a panel of staff indicia that is characterized by said one or more flat notes.
17. The device of claim 10 including a base, the transmission means overlying the base, said second alignment means spaced on the base and said first alignment means defining a frame on the sheet.

(References on following page)

References Cited

UNITED STATES PATENTS

| | | | |
|---|---|---|---|
| 373,069 | 11/1887 | Hill | 84—471 |
| 877,259 | 1/1908 | Thrash. | |
| 972,934 | 10/1910 | Skoog | 84—477 |
| 1,137,394 | 4/1915 | Fowler | 84—470 |
| 1,821,311 | 9/1931 | Lamp | 84—478 |
| 2,353,001 | 7/1944 | Armbruster. | |
| 3,256,765 | 6/1966 | Siegel | 84—478 |
| 2,583,813 | 1/1952 | Burke | 200—86 |
| 2,783,327 | 2/1957 | Luckey | 200—86 |
| 3,308,253 | 3/1967 | Krakinowski | 200—46 |

FOREIGN PATENTS

| | | |
|---|---|---|
| 442,572 | 6/1912 | France. |
| 451,411 | 2/1913 | France. |
| 428,005 | 5/1935 | Great Britain. |
| 442,226 | 2/1936 | Great Britain. |
| 539,987 | 10/1941 | Great Britain. |
| 325,498 | 12/1957 | Switzerland. |
| 388,675 | 6/1965 | Switzerland. |

ROBERT S. WARD, JR., *Primary Examiner.*

U.S. Cl. X.R.

84—477, 483